(12) United States Patent
Hironaka et al.

(10) Patent No.: US 11,697,322 B2
(45) Date of Patent: Jul. 11, 2023

(54) MOVING BODY

(71) Applicant: HONDA MOTOR CO., LTD., Tokyo (JP)

(72) Inventors: Shinji Hironaka, Wako (JP); Yuki Oshitani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 750 days.

(21) Appl. No.: 16/727,075

(22) Filed: Dec. 26, 2019

(65) Prior Publication Data
US 2020/0215876 A1 Jul. 9, 2020

(30) Foreign Application Priority Data

Jan. 9, 2019 (JP) ................................ 2019-002095

(51) Int. Cl.
*B60H 1/00* (2006.01)
*B60S 1/02* (2006.01)
*H05B 3/84* (2006.01)
*B60R 11/00* (2006.01)

(52) U.S. Cl.
CPC .......... *B60H 1/00785* (2013.01); *B60S 1/026* (2013.01); *H05B 3/84* (2013.01); *B60R 2011/0026* (2013.01)

(58) Field of Classification Search
CPC . B60H 1/00785; B60H 1/00742; B60S 1/026; B60S 1/0848; H05N 3/84; B60R 2011/0026; H05B 1/0236
See application file for complete search history.

(56) References Cited

U.S. PATENT DOCUMENTS

| 10,052,963 | B2 | 8/2018 | Ichikawa | |
|---|---|---|---|---|
| 10,351,073 | B2 | 7/2019 | Usami et al. | |
| 2016/0325632 | A1* | 11/2016 | Ichikawa | ................ B60L 53/37 |
| 2017/0182868 | A1* | 6/2017 | Ishikawa | ................ B60R 16/03 |
| 2017/0334364 | A1* | 11/2017 | Usami | ..................... B60R 11/04 |
| 2020/0163167 | A1* | 5/2020 | Adachi | .................... H05B 3/84 |
| 2021/0023910 | A1* | 1/2021 | Rogers | ............... B60H 1/00964 |
| 2021/0105870 | A1* | 4/2021 | Murasato | ................ B60J 1/002 |

(Continued)

FOREIGN PATENT DOCUMENTS

| CN | 105848958 | A | | 8/2016 | |
|---|---|---|---|---|---|
| CN | 107444343 | A | | 12/2017 | |
| CN | 112616210 | A | * | 4/2021 | .............. B60J 1/002 |

(Continued)

OTHER PUBLICATIONS

Chinese Office Action for Chinese Patent Application No. 201911373811.5 dated Jan. 20, 2023 (partially translated).

*Primary Examiner* — Shawntina T Fuqua
(74) *Attorney, Agent, or Firm* — Thomas | Horstemeyer, LLP

(57) ABSTRACT

A moving body includes: a detection unit configured to detect a peripheral situation of the moving body; a heating unit configured to be capable of heating a component of the moving body that is positioned in a detection range of the detection unit; a power receiving unit configured to receive power from an external power supply apparatus of the moving body; and a control unit configured to, when the power receiving unit receives power from the power supply apparatus, control the heating unit so as to be in an operation state.

12 Claims, 3 Drawing Sheets

(56) References Cited

U.S. PATENT DOCUMENTS

2022/0044023 A1\* 2/2022 Xue ................ G06V 10/751

FOREIGN PATENT DOCUMENTS

| CN | 111200881 B | \* 12/2021 | .............. B60J 1/002 |
| JP | 2011230672 A | 11/2011 | |
| JP | 2014-101004 A | 6/2014 | |
| JP | 2016141378 A | 8/2016 | |
| JP | 2017-206098 A | 11/2017 | |

\* cited by examiner

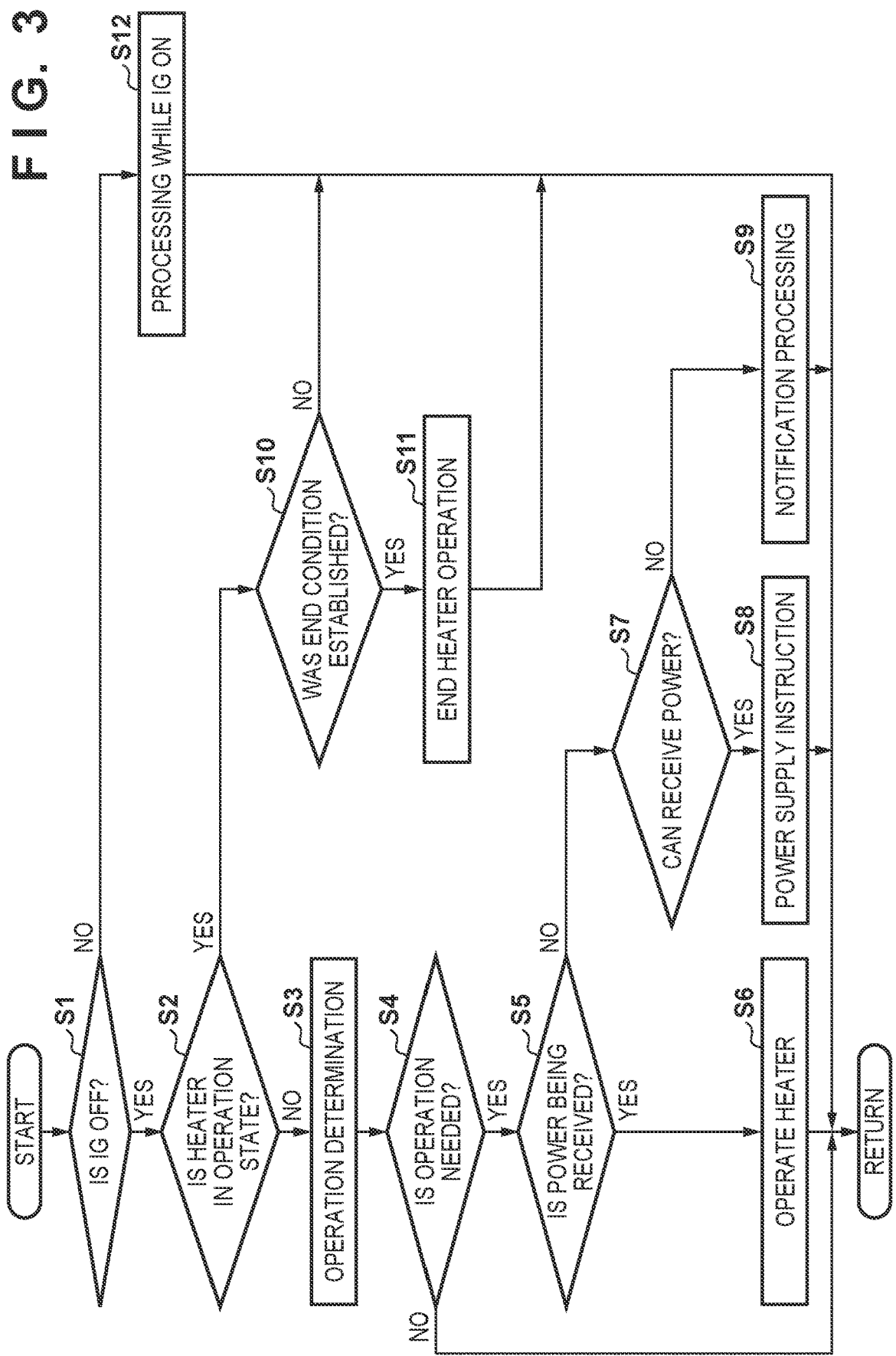

MOVING BODY

CROSS-REFERENCE TO RELATED APPLICATION(S)

This application claims priority to and the benefit of Japanese Patent Application No. 2019-002095 filed on Jan. 9, 2019, the entire disclosure of which is incorporated herein by reference.

BACKGROUND OF THE INVENTION

Field of the Invention

The present invention relates to a moving body typified by a vehicle.

Description of the Related Art

There has been proposed a perimeter security camera-equipped vehicle including a heater to remove fog on a window portion in front of the camera (for example, Japanese Patent Laid-Open No. 2017-206098). The removal of fog on the window portion can prevent the quality degradation of a captured image.

Fog or ice is readily generated at the start of traveling in a cold season such as winter. The fog or ice may degrade the detection performance of a sensor such as a camera at the start of traveling and degrade the detection performance for a peripheral situation. It is preferable to prevent the fog or ice by operating the heater in advance during parking before traveling, but this may consume a large amount of stored power of the in-vehicle battery.

SUMMARY OF THE INVENTION

It is an object of the present invention to prevent the degradation of the detection performance for a peripheral situation while suppressing the consumption of stored power of a moving body.

According to one aspect of the present invention, there is provided a moving body comprising: a detection unit configured to detect a peripheral situation of the moving body; a heating unit configured to be capable of heat a component of the moving body that is positioned in a detection range of the detection unit; a power receiving unit configured to receive power from an external power supply apparatus of the moving body; and a control unit configured to, when the power receiving unit receives power from the power supply apparatus, control the heating unit so as to be in an actuation state.

Further features of the present invention will become apparent from the following description of exemplary embodiments (with reference to the attached drawings).

BRIEF DESCRIPTION OF THE DRAWINGS

FIG. 3 is a flowchart showing an example of processing executed by the control apparatus in FIG. 1.

DESCRIPTION OF THE EMBODIMENTS

Figure 1:
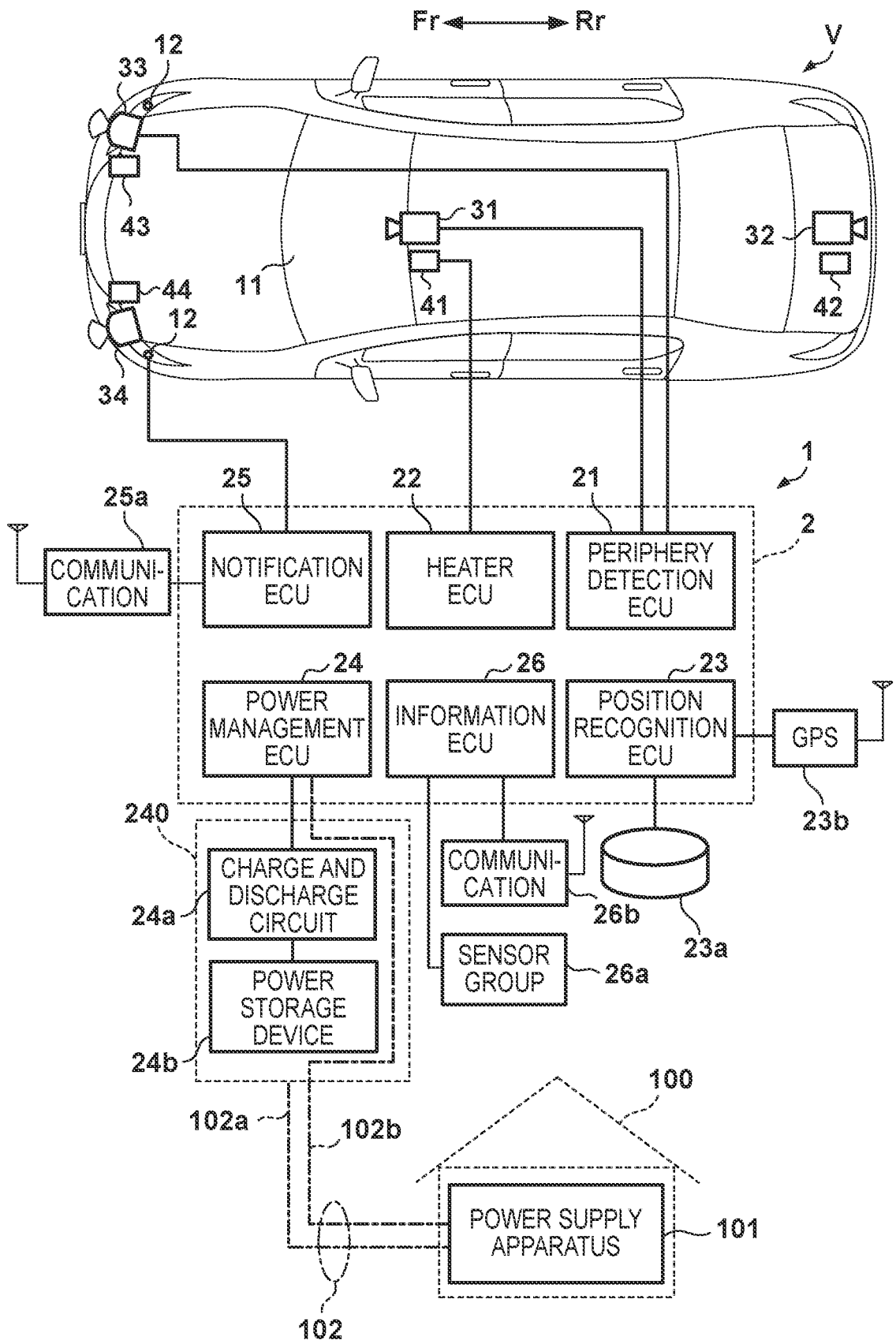
FIG. 1 is a block diagram of a vehicle and a control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle V and a control apparatus 1 for the vehicle V according to an embodiment of the present invention. FIG. 1 shows the schematic arrangement of the vehicle V in a plan view. The vehicle V is a sedan-type four-wheeled vehicle and is an example of a moving body. In FIG. 1, arrows Fr and Rr indicate the front and rear sides of the vehicle V in the front-and-rear direction, respectively.

The vehicle V according to this embodiment is a plug-in hybrid vehicle. A power plant (not shown) that is a traveling driving unit configured to output a driving force to rotate the driving wheels of the vehicle V can include an internal combustion engine, a motor, and an automatic transmission. The motor can be used as a driving source configured to accelerate the vehicle V and can also be used as a power generator at the time of deceleration or the like (regenerative braking). The driving force of the internal combustion engine can be used as energy for power generation of an alternator.

<Control Apparatus>

The arrangement of the control apparatus 1 that is an in-vehicle apparatus of the vehicle V will be described with reference to FIG. 1. The control apparatus 1 includes an ECU group (control unit group) 2. The ECU group 2 includes a plurality of ECUs 21 to 26 configured to be communicable with each other. Each ECU includes a processor represented by a CPU, a storage device such as a semiconductor memory, an interface to an external device, and the like. The storage device stores programs to be executed by the processor, data to be used by the processor for processing, and the like. Each ECU may include a plurality of processors, storage devices, and interfaces. The number of ECUs and the provided functions can be designed appropriately, and they can be subdivided or integrated as compared to this embodiment.

Note that FIG. 1 exemplifies ECUs necessary for the following description, and an ECU for controlling the power plant and the like are not illustrated. Also, in FIG. 1, the names of representative functions of the ECUs 21 to 26 are added. For example, the ECU 21 regarding detection of the peripheral situation of the vehicle V is described as "periphery detection ECU".

The ECU 21 recognizes the peripheral situation (traveling environment) of the vehicle V based on the detection results of detection units 31 to 34 configured to detect the peripheral situation of the vehicle V. All the detection units 31 to 34 are monitoring devices that monitor the perimeter of the vehicle V, and are sensors capable of detecting a target outside the vehicle. In this embodiment, the detection units 31 and 32 are cameras that capture the periphery of the vehicle V and are sometimes referred to as the cameras 31 and 32. The camera 31 is arranged to capture the front of the vehicle V. In this embodiment, the camera 31 is attached to a side of a front window inside the vehicle cabin at the roof front portion of the vehicle V. The camera 32 is arranged to capture the rear of the vehicle V and is arranged on, for example, a rear bumper.

In this embodiment, the detection units 33 and 34 are lidars (Light Detection and Ranging) and are sometimes referred to as the lidars 33 and 34. The lidars 33 and 34 detect a target on the periphery of the vehicle V and measures a distance to a target. In this embodiment, the lidars 33 and 34 are provided one by one at corners of the front portion of the vehicle V.

The detection results of the detection units 31 to 34 can be used for drive assist to a driver. The drive assist can include collision reduction brake, lane departure suppression, or automated driving. When the possibility of collision against a front obstacle rises, the collision reduction brake assists the driver in avoiding the collision by operating a brake device. When the possibility of departure of the vehicle V from the traveling lane rises, the lane departure suppression assists the driver in avoiding the lane departure by operating an electric power steering device. The automated driving causes the vehicle V to travel without requiring a driving operation by the driver.

The ECU 22 controls heaters 41 to 44. The heaters 41 to 44 are provided in correspondence with the detection units 31 to 34. More specifically, the heater 41 is arranged next to the camera 31, and the heater 42 is arranged next to the camera 32. The heater 43 is arranged next to the lidar 33, and the heater 44 is arranged next to the lidar 34. The heaters 41 to 44 are primarily intended to prevent fog, condensation, and ice on components of the vehicle V that are positioned in the detection ranges of the corresponding detection units 31 to 34. The heaters 41 to 44 are, for example, heating wires that generate heat upon energization. The heaters 41 to 44 can also be used to prevent the freeze of the corresponding detection units 31 to 34.

Figure 2:
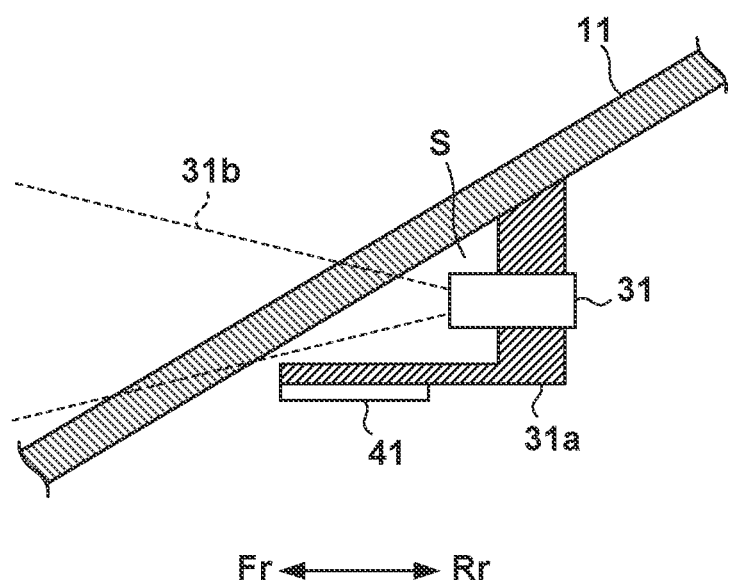
FIG. 2 is a sectional view showing a structure around a detection unit.

The components of the vehicle V that are positioned in the detection ranges of the detection units 31 to 34 can include exterior components such as a window member and a bumper, cover components covering the sensors of the detection units 31 to 34, and the like. The components will be exemplified with reference to FIG. 2. FIG. 2 is a vertical sectional view showing a structure around the camera 31. FIG. 2 shows an example of the attaching structure of the camera 31 to a window member 11 constituting a front window and the arrangement of the corresponding heater 41.

The camera 31 is fixed to the window member 11 via a bracket 31*a*. The window member 11 is, for example, a clear glass plate, and the bracket 31*a* is fixed to a surface of the window member 11 inside the vehicle with an adhesive or the like. A space S defined by the bracket 31*a* and the window member 11 communicates with the vehicle interior at the lower portion of the bracket 31*a*, and air can flow between the space S and the vehicle interior space. The heater 41 is supported by the bracket 31*a* and attached to the bottom of the bracket 31*a* in the example shown in FIG. 2.

The window member 11 is positioned in a detection range (image capturing range) 31*b* of the camera 31. When the window member 11 fogs or ices, the quality of an image captured by the camera 31 may degrade. In this case, the heater 41 is operated to warm the air in the space S by the heat, and the fog or ice on the window member 11 can be removed. The heater 41 may be provided on the window member 11 to be heated, but is provided on the bracket 31*a* as in this embodiment to contribute to ensuring the visibility of an occupant and the easiness of wiring.

Referring back to FIG. 1, the ECU 23 is a position recognition unit configured to recognize the current position of the vehicle V. The ECU 23 includes a GPS sensor 23*b* configured to detect the current position of the vehicle V, and specifies the current position of the vehicle V from the detection result of the GPS sensor 23*b*. A database 23*a* can store accurate map information. The ECU 23 can specify the position of the vehicle V more accurately based on the map information, and can specify a road on which the vehicle V travels or a location (for example, home or facility) where the vehicle V is parked.

The ECU 24 is a power management unit configured to control a power receiving apparatus 240. The power receiving apparatus 240 includes a power storage device 24*b* and a charge and discharge circuit 24*a* that charges and discharges the power storage device 24*b*. While the ECU 24 controls the charge and discharge circuit 24*a* to manage the power storage amount of the power storage device 24*b*, it controls supply of power stored in the power storage device 24*b* to an electric device of the vehicle V. The power storage device 24*b* is, for example, a lithium ion battery.

The power receiving apparatus 240 can receive power from an external power supply apparatus 101, and the received power can be used for charging of the power storage device 24*b* and the like. In this embodiment, the vehicle V and the power supply apparatus 101 can be connected via a cable 102, and power is supplied from the power supply apparatus 101 to the power receiving apparatus 240 via the cable 102. However, a wireless power transfer method is also available as the power supply method to the power receiving apparatus 240.

The cable 102 includes a power line 102*a* and a communication line 102*b*. The ECU 24 can communicate with the power supply apparatus 101 via the communication line 102*b*. By this communication, the ECU 24 can check whether the vehicle V is being connected to the power supply apparatus 101. For example, when the power storage amount of the power storage device 24*b* is small, the ECU 24 transmits a power supply request to the power supply apparatus 101, and when the power storage amount reaches a predetermined value, transmits a power supply stop instruction to the power supply apparatus 101. The power supply apparatus 101 operates in correspondence with an instruction from the ECU 24.

In this embodiment, the power supply apparatus 101 is a home power conditioner installed in a house 100 that is the home of the user of the vehicle V. The power supply apparatus 101 is an apparatus configured to perform power management in the house 100, and controls, for example, power from a solar battery (not shown) and storage/discharge of system power. Note that the apparatus that supplies power to the power receiving apparatus 240 is not limited to the home power conditioner and may be a commercial power supply apparatus at a charging station.

The ECU 25 is a notification control unit configured to control notification of information to the user of the vehicle V. In this embodiment, the ECU 25 can control driving of indicators 12. The indicators 12 are direction indicators in this embodiment and also function as notification devices to the user. As an example of the notification, the indicators 12 can be lighted in a specific pattern to prompt the user to supply power from the power supply apparatus 101 to the power receiving apparatus 240. The ECU 25 includes a communication device 25*a* configured to perform wireless communication. The communication device 25*a* can wirelessly communicate with a communication terminal such as a smartphone held by the user, and can notify the user of information. As an example of the notification, the communication device 25*a* can transmit a message (for example, e-mail) to the communication terminal of the user to prompt the user to supply power from the power supply apparatus 101 to the power receiving apparatus 240.

The ECU 26 is an information collection unit configured to collect various kinds of information from an in-vehicle sensor group 26a and a communication device 26b. The in-vehicle sensor group 26a includes sensors configured to detect an environment in which the vehicle V is located. These sensors are, for example, a sensor for detecting an air temperature outside the vehicle (outside air temperature), a sensor for detecting an in-vehicle temperature, and a sensor for detecting an in-vehicle humidity. The communication device 26b is a wireless communication device and acquires information by communication from an information providing server via a communication network such as the Internet. The information to be acquired is, for example, weather information. The weather information includes air temperature, humidity, weather, or weather forecast.

<Control Example>

A control example of the control apparatus 1 will be described. FIG. 3 is a flowchart showing an example of driving control processing of the heater 41 executed by the ECU 22. Note that similar control is also applicable to the heaters 42 to 44.

The window member 11 readily fogs or ices in a cold season such as winter, and the fog or ice may degrade the detection performance (for example, the quality of a captured image) of the camera 31. The fog or ice can be prevented by operating the heater 41 in advance when the vehicle V is parked in the house 100 that is the home of the user. However, the operation of the heater 41 involves power consumption, so the power storage amount of the power storage device 24b may decrease.

In this embodiment, the heater 41 is operated on condition that power is being supplied from the power supply apparatus 101. Hence, the heater 41 can be operated by power from the power supply apparatus 101, and the decrease in the power storage amount of the power storage device 24b can be avoided.

The processing example in FIG. 3 is executed repetitively in a predetermined cycle. In step S1, whether the vehicle V is parked is determined from whether the ignition (IG) is OFF. If the ignition is OFF, it is determined that the vehicle V is parked, and the process advances to step S2; if the ignition is not OFF, to step S12.

In step S2, it is determined which of the operation state and the operation stop state the heater 41 is in. If the heater 41 is in the operation stop state, the process advances to step S3; if it is in the operation state, to step S10.

In step S3, it is determined whether the heater 41 needs to be operated. The case in which the heater 41 needs to be operated is, for example, a case in which an already generated fog or ice is removed or generation of fog is prevented, and in other words, a case in which moisture attaches to the window member 11 or is predicted to attach. Whether moisture attaches to the window member 11 can be determined from, for example, an image captured by driving the camera 31. If the presence of fog or ice is confirmed by image analysis of the captured image, it can be determined that the heater 41 needs to be operated to remove the fog or ice.

The attachment of moisture to the window member 11 can be predicted based on an environment in which the vehicle V is placed. More specifically, this can be predicted based on, for example, information of an outside air temperature, a change of the outside air temperature per unit time, an in-vehicle humidity, a season, or weather that is collected by the ECU 26. When the outside air temperature is low or suddenly changes to be low (for example, a change of about 10° C.), the window member 11 readily fogs. At a high in-vehicle humidity or in a cold season (December to February in Japan), the window member 11 readily fogs. To the contrary, the fog is hardly generated in a warm season (July to September in Japan). When it rains, the fog is readily generated. Based on such environment information, it can be predicted whether moisture will attach to the window member 11, for example, fog will be generated.

In step S4, if it is determined from the determination processing in step S3 that the heater 41 needs to be operated, the process advances to step S5; if it is determined that the heater 41 need not be operated, the process ends. In step S5, it is determined whether the power receiving apparatus 240 receives power from the power supply apparatus 101. Whether power is received can be determined by confirming the ECU 24. If power is received, the process advances to step S6; if no power is received, to step S7.

In step S6, the heater 41 is controlled to change to the operation state. More specifically, the heater 41 is energized. Accordingly, fog on the window member 11 can be removed or prevented, and the detection performance of the camera 31 at the start of traveling of the vehicle V can be easily ensured. Since the driving power of the heater 41 can be covered by power received from the power supply apparatus 101, a decrease in the power storage amount of the power storage device 24b can be suppressed. Especially in this embodiment, the processing in step S6 is executed when the ignition is OFF (step S1), so power generation using the driving force of the internal combustion engine is not performed. However, the heater 41 can be driven using power received from the power supply apparatus 101, without requiring discharge of the power storage device 24b.

Even in a state in which the power receiving apparatus 240 can receive power from the power supply apparatus 101, the supply of power has ended when, for example, the charge of the power storage device 24b is completed. In step S7, it is determined whether the power receiving apparatus 240 can receive power from the power supply apparatus 101. If the power receiving apparatus 240 can receive power, the process advances to step S8; if it cannot receive power, to step S9. For example, when the power receiving apparatus 240 and the power supply apparatus 101 are connected via the cable 102, the power receiving apparatus 240 can receive power. This can be determined by confirming the ECU 24.

In step S8, a power supply instruction is issued. The power supply instruction can be transmitted from the ECU 22 to the power supply apparatus 101 via the ECU 24. In response to this, the power supply apparatus 101 starts power supply to the power receiving apparatus 240. In the next and subsequent rounds of the processing of FIG. 3, it is determined in step S5 that power is being received, and the heater 41 is controlled to change to the operation state in step S6.

In step S9, notification processing is performed to prompt the user of the vehicle V to supply power. Here, the indicators 12 are lighted in a specific pattern. Alternatively, a message is transmitted from the communication device 25a to the communication terminal of the user. This prompts the user to manipulate the power supply apparatus 101 to connect the cable 102 of the power supply apparatus 101 to the vehicle V or supply power to the power receiving apparatus 240. The user takes action complying with the notification. Then, in the next and subsequent rounds of the processing of FIG. 3, it is determined in step S5 that power is being received, and the heater 41 is controlled to change to the operation state in step S6.

In step S10, it is determined whether the operation end condition of the heater 41 has been established. The operation end condition is that, for example, the driving time of the heater 41 has reached a predetermined value or an operation requiring situation in the operation determination of step S3 is canceled. If the operation end condition has been established, the process advances to step S11 to end the operation of the heater 41. More specifically, the energization to the heater 41 is stopped. If the operation end condition has not been established, the processing in FIG. 3 ends.

In step S12, driving control processing of the heater 41 during ignition ON is performed. This processing can be similar to one at the time of ignition OFF except for the condition that the power receiving apparatus 240 receives power. For example, operation determination similar to one in step S3 is performed, and if it is determined that the heater 41 needs to be operated, the heater 41 is operated even if the power receiving apparatus 240 does not receive power. Accordingly, one driving control processing of the heater 41 ends.

Other Embodiments

In the above-described embodiment, a four-wheeled vehicle has been described as an example of the moving body. However, the moving body includes vehicles such as a four-wheeled vehicle and a two-wheeled vehicle, and apparatuses with a movement propulsion mechanism such as a ship and a flight vehicle. The flight vehicle includes aircrafts such as a rotary aircraft, a fixed-wing aircraft, and an airship, and also includes a flight personal mobility, a spacecraft, and a space shuttle. The four-wheeled vehicle is not limited to a plug-in hybrid vehicle as in the above-described embodiment, but is also an electric car having no internal combustion engine.

In the above-described embodiment, the cameras 31 and 32 and the lidars 33 and 34 have been exemplified as detection units configured to detect the peripheral situation of the vehicle V. However, the detection units are not limited to them and, for example, a milliwave radar and an ultrasonic sensor can also be adopted. The number and layout of detection units are not limited to those in the example of FIG. 1 and can be designed appropriately. For example, side cameras may be provided to capture images on the sides of the vehicle V.

The heaters 41 to 44 are provided individually for the respective detection units 31 to 34 in the above-described embodiment, but there may be a detection unit having no heater. Alternatively, adjacent detection units may share a common heater. The processing in FIG. 3 may be performed for all or some of the heaters.

The schedule of use of the vehicle V is not considered in the processing of FIG. 3 in the above-described embodiment, but may be considered. For example, the processing of FIG. 3 may start a predetermined time (for example, 15 min) before the estimated time of use of the vehicle V. The estimated time of use of the vehicle V may be registered in advance in the control apparatus 1 by the user or may be predicted by the control apparatus 1 from the history of past use of the vehicle V.

In the above-described embodiment, when the power receiving apparatus 240 does not receive power from the power supply apparatus 101 in the processing of steps S5 and S6 of FIG. 3, the heater 41 is not operated, but there may be an exception. For example, when the power storage amount of the power storage device 24b is equal to or larger than a predetermined value, the heater 41 may be controlled to change to the operation state even if the power receiving apparatus 240 does not receive power.

In the above-described embodiment, notification processing is performed in the processing of step S9 of FIG. 3 regardless of the parking place of the vehicle V. However, when the vehicle V is parked not at home but in a place away from home, the user may not be able to take action complying with a notification because the power supply apparatus 101 is away. Hence, when the vehicle V is not parked at home, no notification may be made. The parking place of the vehicle V can be determined from position information recognized by the ECU 23.

In the above-described embodiment, whether the vehicle V is parked is determined from whether the ignition is OFF in the processing of FIG. 3 (step S1). However, whether the vehicle V is parked may be determined based on another factor such as whether the speed is 0.

Summary of Embodiment

The above-described embodiment discloses at least the following embodiments.

1. A moving body (for example, V) according to the above-described embodiment comprises:
    a detection unit (for example, 31) configured to detect a peripheral situation of the moving body;
    a heating unit (for example, 42) configured to be capable of heating a component (for example, 11) of the moving body that is positioned in a detection range of the detection unit;
    a power receiving unit (for example, 240) configured to receive power from an external power supply apparatus of the moving body; and
    a control unit (for example, 1, 22) configured to, when the power receiving means receives power from the power supply apparatus, control the heating unit so as to be in an operation state.

According to this embodiment, the degradation of the detection performance for a peripheral situation at the start of movement can be prevented while suppressing the consumption of stored power of the moving body.

2. In the above-described embodiment,
    the control unit configured to determine whether the heating unit needs to be operated (for example, S3), and when the control unit determines that the heating unit needs to be operated and the power receiving unit receives power from the power supply apparatus, controls the heating unit to so as to be in the operation state (for example, S5, S6).

According to this embodiment, unnecessary control of the heating unit to the operation state can be suppressed, and the power consumption of the heating unit can be suppressed.

3. In the above-described embodiment,
    the control unit determines, based on an environment in which the moving body is placed, whether the heating unit needs to be operated.

According to this embodiment, the heating unit can be operated in correspondence with generation of fog or ice.

4. In the above-described embodiment,
    when attachment of moisture to the component is predicted, the control unit determines that the heating unit needs to be operated.

According to this embodiment, the heating unit can be operated based on the prediction of generation of fog or ice.

5. In the above-described embodiment,
    the moving body is a vehicle, and
    the environment includes an outside air temperature, an in-vehicle temperature, and/or weather.

According to this embodiment, the heating unit can be operated in correspondence with generation of fog or ice.

6. In the above-described embodiment,
when the control unit determines that the heating unit needs to be operated and the power supply apparatus does not supply power, the control unit instructs the power supply apparatus to supply power (for example, S5,S7,S8).

According to this embodiment, the heating unit can be operated easily in terms of power supply.

7. In the above-described embodiment,
when the control unit determines that the heating unit needs to be operated and when the power supply apparatus does not supply power, the control unit issues a notification to a user to prompt power supply (for example, S5, S9).

According to this embodiment, the heating unit can be operated easily by user's action in terms of power supply.

8. In the above-described embodiment,
the moving body is a vehicle,
the detection unit is a camera,
the component is a window member positioned in an image capturing range of the camera, and
the heating unit is a heater configured to remove fog on the window member.

According to this embodiment, the image capturing performance of the camera that is readily influenced by fog can be ensured easily.

The invention is not limited to the foregoing embodiments, and various variations/changes are possible within the spirit of the invention.

What is claimed is:

1. A moving body comprising:
a detection unit configured to detect a peripheral situation of the moving body;
a heating unit configured to be capable of heating a component of the moving body that is positioned in a detection range of the detection unit;
a power receiving unit configured to receive power from an external power supply apparatus of the moving body; and
a control unit configured to, when an ignition is off and the power receiving unit receives power from the power supply apparatus, control the heating unit so as to be in an operation state,
wherein when the ignition is off and the power receiving unit receives power from the power supply apparatus, the control unit starts a processing for operating the heating unit at a predetermined time based on an estimated time of use of the body.

2. The body according to claim 1, wherein the control unit is configured to determine whether the heating unit needs to be operated, and when the control unit determines that the heating unit needs to be operated and the power receiving unit receives power from the power supply apparatus, to control the heating unit so as to be in the operation state.

3. The body according to claim 2, wherein the control unit determines, based on an environment in which the moving body is placed, whether the heating unit needs to be operated.

4. The body according to claim 2, wherein when attachment of moisture to the component is predicted, the control unit determines that the heating unit needs to be operated.

5. The body according to claim 3, wherein
the moving body is a vehicle, and
the environment includes an outside air temperature, an in-vehicle temperature, and/or weather.

6. The body according to claim 1, wherein when the control unit determines that the heating unit needs to be operated and the power supply apparatus does not supply power, the control unit instructs the power supply apparatus to supply power.

7. The body according to claim 1, wherein when the control unit determines that the heating unit needs to be operated and the power supply apparatus does not supply power, the control unit issues a notification to a user to prompt power supply.

8. The body according to claim 1, wherein
the moving body is a vehicle,
the detection unit is a camera,
the component is a window member positioned in an image capturing range of the camera, and
the heating unit is a heater configured to remove fog on the window member.

9. The body according to claim 1, wherein
when the ignition is off and the power receiving unit receives power from the power supply apparatus, the control unit receives an image from the camera, determines whether moisture attaches to a window member based on the image, and operates the heating unit if it is determined that the moisture attaches to the window member.

10. The body according to claim 1, wherein
the control unit predicts the estimated time from a history of past use of the body.

11. The body according to claim 7, wherein
the control unit does not issue the notification when the body is in a place away from home.

12. A moving body comprising:
a detection unit configured to detect a peripheral situation of the moving body;
a heating unit configured to be capable of heating a component of the moving body that is positioned in a detection range of the detection unit;
a power receiving unit configured to receive power from an external power supply apparatus of the moving body; and
a control unit configured to, when an ignition is off and the power receiving unit receives power from the power supply apparatus, control the heating unit so as to be in an operation state,
wherein
the control unit is configured to determine whether the heating unit needs to be operated,
when the control unit determines that the heating unit needs to be operated and the power receiving unit receives power from the power supply apparatus, the control unit controls the heating unit so as to be in the operation state,
when the control unit determines that the heating unit needs to be operated and the power supply apparatus does not supply power under a state in which the power receiving unit can receive power from the power supply apparatus, the control unit instructs the power supply apparatus to supply power, and
when the control unit determines that the heating unit needs to be operated and the power supply apparatus does not supply power under a state in which the power receiving unit cannot receive power from the power supply apparatus, the control unit issues a notification to a user to prompt power supply.

* * * * *